May 31, 1938.  H. HOLZWARTH  2,118,814
COMBUSTION ENGINE POWER PLANT FOR DRIVING VEHICLES
Filed Dec. 24, 1934.  6 Sheets-Sheet 1

Inventor
Hans Holzwarth

Fig. 2

May 31, 1938. H. HOLZWARTH 2,118,814
COMBUSTION ENGINE POWER PLANT FOR DRIVING VEHICLES
Filed Dec. 24, 1934 6 Sheets-Sheet 3

May 31, 1938.   H. HOLZWARTH   2,118,814
COMBUSTION ENGINE POWER PLANT FOR DRIVING VEHICLES
Filed Dec. 24, 1934   6 Sheets-Sheet 4

Inventor
Hans Holzwarth

May 31, 1938.  H. HOLZWARTH  2,118,814
COMBUSTION ENGINE POWER PLANT FOR DRIVING VEHICLES
Filed Dec. 24, 1934  6 Sheets-Sheet 6

Inventor
Hans Holzwarth

Patented May 31, 1938

2,118,814

UNITED STATES PATENT OFFICE 2,118,814

COMBUSTION ENGINE POWER PLANT FOR DRIVING VEHICLES

Hans Holzwarth, Dusseldorf, Germany, assignor to Holzwarth Gas Turbine Co., San Francisco, Calif., a corporation of Delaware Application December 24, 1934, Serial No. 759,003
In Germany December 27, 1933

13 Claims. (Cl. 105—62)

The present invention relates to a combustion engine power plant for driving vehicles, especially track vehicles, such as railway driving cars and locomotives, the plant being characterized by the use of elongated, preferably cylindrical combustion chambers of constant volume, particularly constant volume explosion chambers, for the production of gases under pressure with which the plant is driven. Such combustion engine plants consist, as is known, of a series of energy producing machines and additional auxiliary devices. Thus, for example, combustion power plants for vehicles are known in which the compressed gases generated in the combustion chambers are utilized first in a combustion gas turbine which drives, for example, a compressor, and then operate an exhaust gas turbine arranged after such combustion gas turbine, the exhaust gas turbine developing the external or available output which may be employed for driving the vehicle. The exhaust gas turbine is generally assisted by an expansion machine, such as a steam turbine, which is driven by steam generated with the waste heat of the plant. For operating the explosion chambers there are also required various devices, such as charging and igniting devices, control mechanism for the inlet and outlet members, etc. Further, to obtain a productive and economical utilization of the compressed gases generated in the combustion chambers with recovery and profitable utilization of the waste heat it is necessary that the combustion engine plant be composed of many individual parts in view of the necessary output developing machines and the auxiliary devices. As, however, in vehicles, particularly in track vehicles, more especially in self-driven cars and coaches, an extremely limited space, both as to height and width and also as to length is available for accommodating the power plant, the arrangement of such a plant, and especially of the more modern combustion engine plants with their numerous auxiliary devices, creates great difficulties. Of first importance are the combustion chambers, for to obtain good combustion conditions and an abundant gas generation, elongated combustion chambers and consequently chambers having a rather large combustion space must be employed which, because of their size and shape, require very much space. Such combustion chambers of more recent construction have been increased in length also for the reason that they are equipped with conical end pieces to secure better scavenging and charging conditions, the inlet and outlet valves being positioned in such end pieces. These difficulties are further increased to a very important degree because of the fact that favorable and safe running characteristics of the vehicle are dependent upon a proper division of the load and thus upon a definite arrangement of the individual members of the plant. Moreover, there is to be considered the fact that the individual parts of the plant should follow each other organically, in order that all energy transmitting means, such as driving shafts, conduits for the gases, cooling agent, oil, air and steam, and likewise the control linkages etc. may be made as short as possible, while the different machines and likewise the power transmitting parts must remain easily accessible so that they may be conveniently inspected by the attendants and when required can be examined rapidly and without difficulty. Of particular importance is the arrangement of the combustion chambers in such a manner that favorable and economical combustion conditions are provided.

From the above-mentioned main requirements it will be clear that in the construction of tractive vehicles upon which a combustion machine plant is arranged, a whole series of important considerations of vehicular and combustion-technical nature must be taken into account, which in the practical development of vehicles, especially railway drive cars with combustion machine power plants, have, as is known, presented very great difficulties.

According to the present invention, there is provided, with the above-mentioned requirements in view, an arrangement of a combustion power plant having elongated combustion chambers of constant volume, and preferably an explosion gas turbine plant, which is particularly adapted for railway self-propelled cars and which is superior to known arrangements from the standpoint of vehicular, operating, and combustion-technical viewpoints in many and important respects which are explained more fully hereinbelow in connection with the description of the examples of the invention. The arrangement of the combustion engine plant upon vehicles in accordance with the invention is characterized primarily by the fact that the elongated aggregate of the plant, above all the combustion chambers, are arranged upright upon the vehicle as symmetrically as possible with respect to the central longitudinal axis of the vehicle, so that there is obtained a narrow machine space which takes up little floor area of the car.

Other features of the invention will be described more fully hereinbelow in connection with the accompanying drawings which show several satisfactory embodiments of the invention in the form of a railway self-propelled car. In said drawings.

Figure 9:
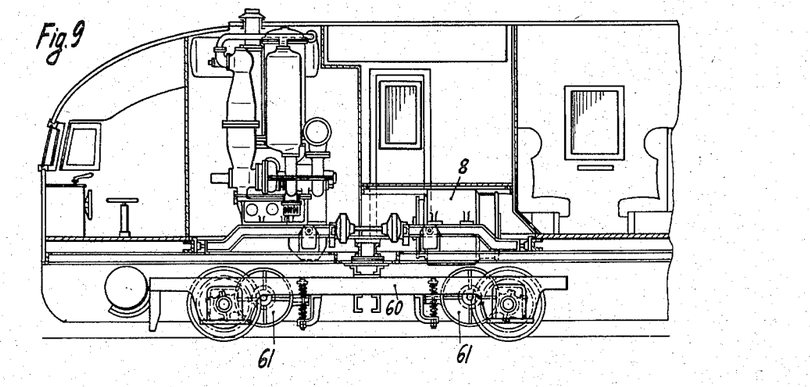
Fig. 9 illustrates another embodiment of the invention and shows a combustion engine mounted upon a car in which, in contrast to the form of the invention shown in Figs. 1–8, all engines and parts of the combustion plant are positioned in the machine space (at and above the level of the floor of the car)

Referring to the drawings, the numeral 1 shows a self-propelled railway car or coach, the driver's compartment being shown at 2, the engine room at 3 and the passenger compartment at 4, the latter being provided with suitable seats. The forward and rear ends of the car which may consist, for example, of two parts, are each supported upon an end bogie frame or truck 5, while the adjoining ends of the two halves of the car lie upon a middle bogie frame which is not shown on the drawings. The connection between the body of the car and each of the trucks is effected in known manner by means of a king pin 6 which is fixed to the frame of the car body and fits into a socket 7 located upon the frame of the truck 5. In the forward truck (and if necessary also in the rearward one) there is arranged a generator 8 which is supported upon an auxiliary frame 9 which may advantageously be so suspended at three points upon the bogie truck that deformations of the truck are kept from the auxiliary frame and thus also from the generator. A second auxiliary frame 10 is mounted upon the bogie truck in the same way, and in the embodiment of the invention illustrated in Figs. 1 to 8, the actual combustion machine plant together with the power transmitting parts (transmission casing 11) is mounted upon such auxiliary frame. The transmission casing 11 and the generator 8 are coupled directly to each other by means of couplings 12 of known construction which operate in the manner of a Cardan joint, so that they can take up movements and vibrations between the two auxiliary frames 9 and 10.

Figure 1:
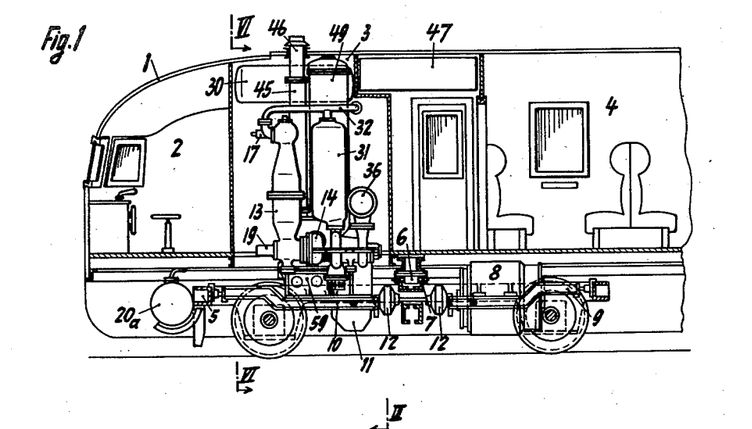
Fig. 1 shows schematically a longitudinal section through the forward end of the car which contains the machine space and the driver's compartments.
Figure 2:
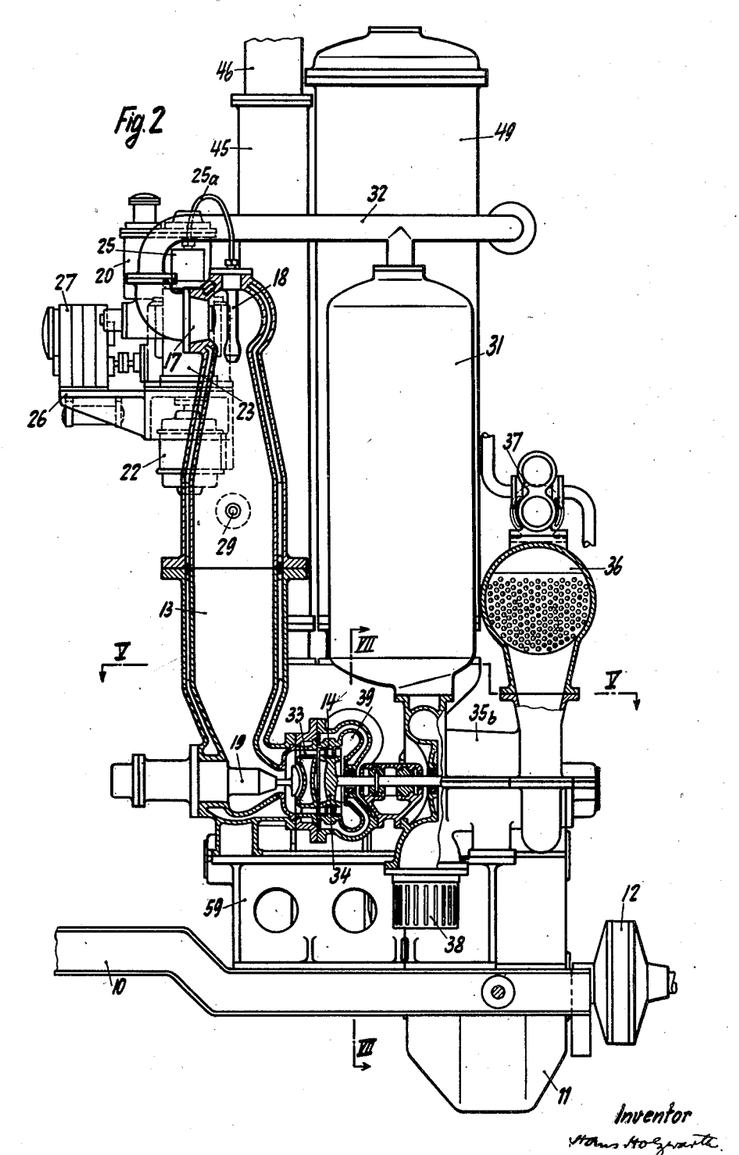
Fig. 2 shows in enlarged longitudinal section, partly in elevation, the half of the power plant lying to one side of the central longitudinal axis of the vehicle, and is taken along the line II—II of Fig. 6.
Figure 3:
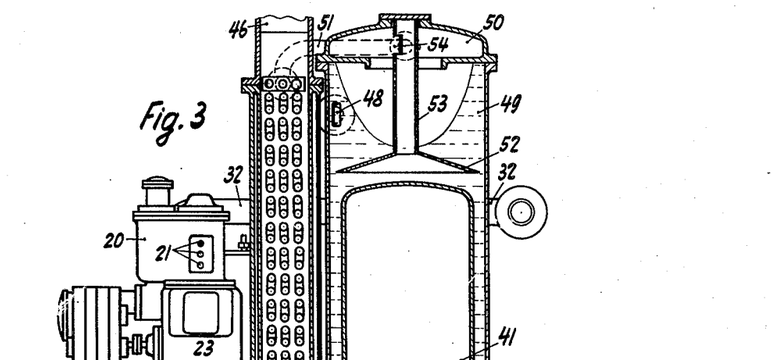
Fig. 3 is a central longitudinal section of the same plant along the line III—III of Fig. 6.
Figure 4:
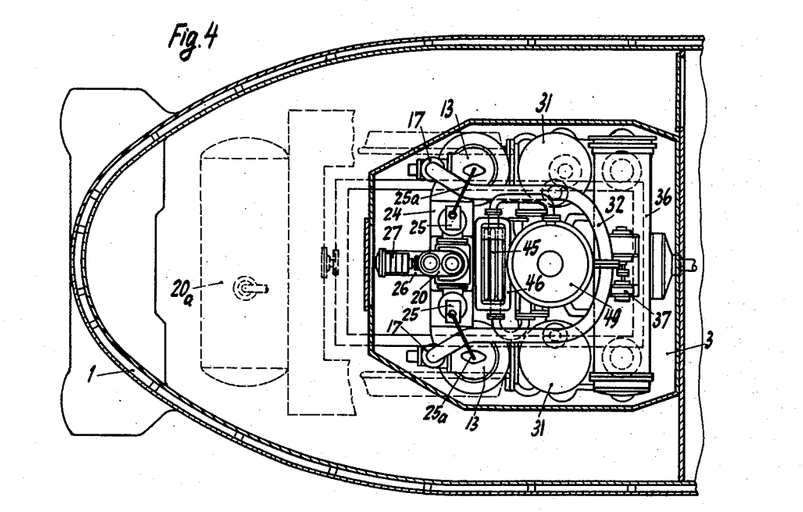
Fig. 4 is a plan view of the power plant with the roof of the car and of the machine space removed.
Figure 5:
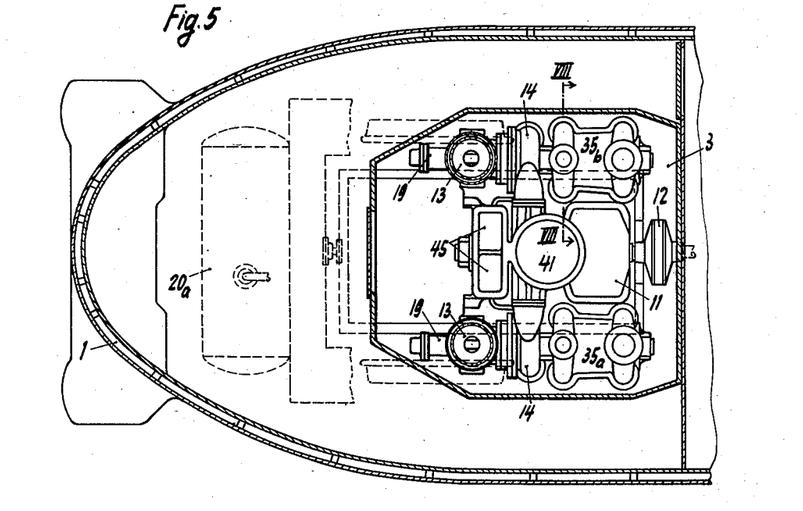
Fig. 5 is a horizontal section through the power plant along the line V—V of Figs. 2 and 3.
Figure 6:
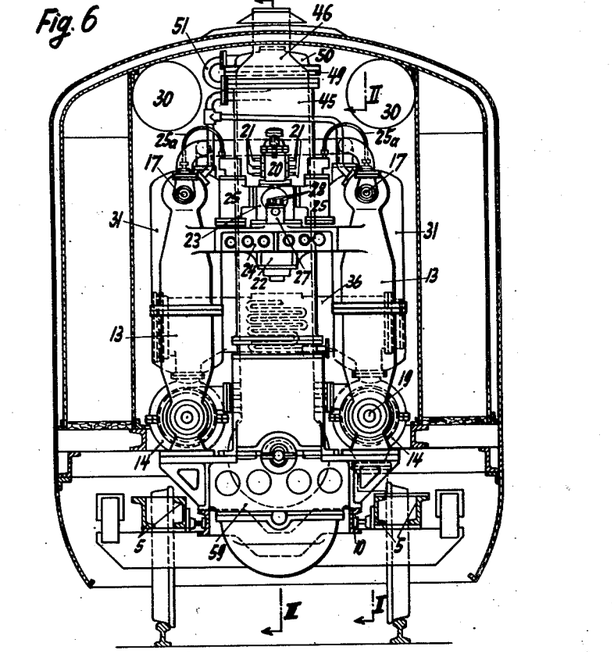
Fig. 6 is a transverse section through the car along the lines VI—VI of Fig. 1, the power plant being visible in front elevation.

The combustion engine plant itself consists of two elongated explosion chambers 13 whose main body portion is of substantially cylindrical form, the chambers being provided with conical shaped end portions; the plant includes also an explosion gas turbine 14 arranged after such chambers in the path of the combustion gases, and likewise an exhaust gas turbine 15 (Fig. 3) which is continuously impinged by the exhaust gases of said explosion turbine mixed with steam, the exhaust gas turbine being coupled with a pure steam turbine 16. The explosion chambers 13 are surrounded by a cooling jacket (see Fig. 2) and are divided approximately midway of their length. The chambers are equipped with an air inlet valve 17, a fuel inlet valve or injector 18 and the outlet member or valve 19, the so-called nozzle valve. The parts 17, 18 and 19 are controlled in known manner with the aid of a pressure medium (control oil) distributor 20 (Figs. 2, 3, 4 and 6) provided with connections 21 which at predetermined instants conduct such pressure medium to the parts to be controlled and then relieve the latter of pressure. The pressure medium distributor, which draws the control oil from the supply tank 20a is driven from below by the electromotor 22 through a reduction gearing which is arranged in a housing 23 flanged to the bottom of the distributor. The construction and operation of the distributor are well known in the art and need not be described in detail.

According to the invention, the two explosion chambers are arranged vertically upright, symmetrically to the central longitudinal axis of the car. The inlet end of the chambers is at the top. The chambers are rigidly connected with each other adjacent to their inlet end by means of a cross beam 24 which is connected at its ends to suitable flanges on the explosion chambers. Upon the cross beam, midway of its length, that is in the central longitudinal plane of the vehicle, there is arranged the pressure medium distributor 20 with the transmission housing 23 below it. There are also arranged upon the cross beam the two fuel pumps 25 (Figs. 2 and 6) which are flanged to both sides of the transmission housing 23 symmetrically to the central longitudinal axis of the car. Inside of the channel-shaped cross beam, likewise in the central longitudinal plane of the vehicle, there is suspended the driving motor 22 for the pressure medium distributor 20. Finally, the igniting mechanism 27 is anchored upon a bracket 26 extending from the cross beam, such igniting device lying in the central longitudinal plane of the vehicle and being driven from the motor 22 through the transmission housing 23. The igniting machine is connected with the igniting devices 29 of the two explosion chambers 13 by means of the cable 28. The fuel pumps 25 withdraw the fuel from the two supply tanks 30 arranged under the roof of the car symmetrically to the longitudinal axis of the vehicle, the pumps feeding the fuel through a pressure conduit 25a to the fuel inlet valves 18. The air required for charging and if desired also for scavenging the explosion chambers flows from two vertically arranged and symmetrically positioned air tanks 31 and flows through the equalizing conduit 32 to the air inlet members 17.

By virtue of the fact that the pressure medium distributor 20 for the control members is located symmetrically between the two explosion chambers there results the advantage that the conduits to the individual controlled members are of equal length. So far as the inlet members are concerned, these feed conduits are furthermore very short, so that there arises on the one hand a very easily supervised plant, and on the other hand the disturbances and pressure losses associated with long conduits are limited to the smallest possible magnitude.

By arranging the explosion chambers 13 vertically there is obtained a combustion engine plant of the smallest conceivable floor area, so that, contrasted with the known arrangements wherein the explosion chambers were positioned horizontally, very little valuable space is lost in the arrangement of the combustion engine plant. If the arrangement of the chambers is furthermore so carried out that the chamber inlet ends as shown, are positioned at the top, so that the fuel inlet member 18 is directed downwardly, various noteworthy advantages are secured. The fuel which after each injection trickles down to the mouth of the injection nozzle and clings to the latter in the form of a drop is torn off, partly under action of its own weight and partly by the flowing air. The falling drop of fuel becomes vaporized during its descent through the elongated explosion chamber 13, so that falling of the drop upon the wall of the chamber or its constructional parts and hence covering of the same with soot is prevented. The trickling fuel likewise finds no opportunity to form soot externally upon the head of the nozzle and in this way clog the injection opening of the nozzle. Frequent cleaning of the chamber and of the fuel inlet member is therefore eliminated, which signifies an important advantage for the operation of the vehicle, for in this type of device frequent and troublesome interruptions in the operation are extremely undesirable.

From the illustrated arrangement of the explosion chambers with the outlet ends at the bottom there results further the advantage, from the combustion-technical viewpoint that when the discharge from the chamber is complete, the hottest zone is at the bottom of the chamber. If the chambers are now charged, there occurs therein immediately a movement between the hot material and the cooler charged materials, since the hot, lighter materials at the bottom tend to flow upwardly. This movement in the interiors of the chambers brings about the result that the charged media are intimately mixed with each other, so that the combustion of the contents of the chamber takes place with certainty and without residue.

Figure 8:
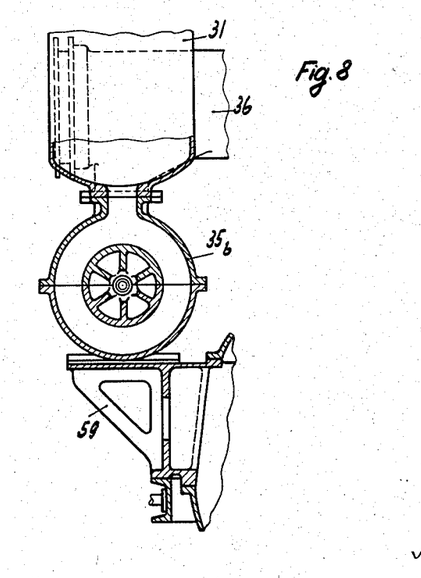
Fig. 8 is a partial cross-section through the power plant along the lines VIII—VIII of Fig. 5.

The hot gases generated in the explosion chambers, upon opening of the nozzle valve 19, flow through the annular nozzle channel 33 into the explosion turbine 14 which is arranged in the gas path of each chamber 13, the gases being directed against a rotor 34 which is built in the form of a two-ring, full-admission Curtis wheel. The explosion turbines each drive a compressor 35a and 35b, respectively, in which the charging air for the explosion chambers is produced in stages. The compressor 35a is formed as a low pressure stage and the compressor 35b as a high pressure stage, the stages being connected with each other through an intermediate cooler 36 lying transversely to the path of travel of the vehicle. A pump 37 is provided upon the interstage cooler and constantly feeds a cooling agent (such as water) through the tubes of the cooler. The low pressure stage 35a sucks air from the atmosphere through a pipe 38. The air partially compressed in the low pressure stages flows into the high pressure stage 35b of the compressor by way of the interstage cooler 36 and is compressed to the final pressure. The delivered charging air is fed into the two cylindrical collectors or tanks 31 disposed upon the compressors, such collectors being connected by way of the equalizing conduit 32 which, as already stated, is connected with the air inlet members 17 of the explosion chambers 13. In Fig. 8 there is shown the connection between the discharge collector space of the high pressure stage of the compressor and the air tank 31 located above it. The air collectors are arranged in the same longitudinal planes of the vehicle in which the explosion chambers 13, the explosion turbines 14 and the compressors 35a, 35b are positioned, so that a completely symmetrical arrangement of the parts of the plant is afforded.

Figure 7:
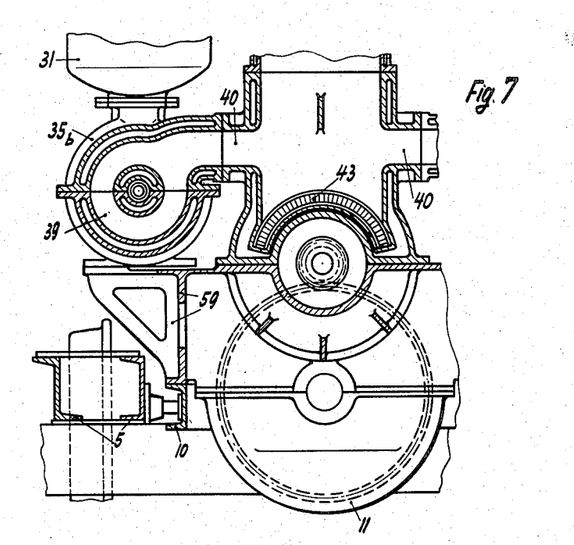
Fig. 7 is a partial transverse section through the lower part of the power plant along the line VII—VII of Figs. 2 and 3.

The combustion gases which have been partially exhausted in the rotors of the explosion turbines 14 flow into the exhaust collecting spaces 30 of such turbines, such spaces being connected through a tangential opening 40 (see Figs. 3 and 7) with the interior of a pressure equalizer 41 in which the exhaust gases of both explosion turbines collect. The pressure equalizer 41, like the explosion chambers, is arranged to stand upright; it is positioned in the central longitudinal axis of the vehicle and is flanged (see Fig. 7) at its bottom gas inlet end to the outlet pipes of the explosion turbines. After the gases have expanded in the pressure equalizer to an intermediate pressure they flow off through the outlet channel 42 located upon the floor of the pressure equalizer and mix with the exhaust steam leaving the steam turbine 16; they are then conducted through the nozzle 43 to the continuous current turbine 15, which is coupled with such steam turbine, for doing further work; both turbines lie in the longitudinal axis of the vehicle. The gases which have been exhausted in the continuous current turbine 15 down to the exhaust pressure are collected in pipes 44 whence they pass through a heat exchanger 45 connected thereto and arranged in the upright position; the gases are finally discharged into the atmosphere through pipes 46. The heat exchanger 45 is likewise arranged in the longitudinal axis of the vehicle and extends closely parallel to the pressure equalizer, so that both aggregates stand as much as possible in a vertical plane over the two expansion machines 15, 16. This affords the advantage of an extremely narrow constructional arrangement, so that only a very small part of the valuable surface of the vehicle is required for supporting the power plant.

The steam required for operating the steam turbine 16 is generated by the waste heat of the combustion plant. The feed water is stored upon the vehicle in a supply tank 47 (see Fig. 1) preferably arranged directly below the roof of the car. The feed water is circulated by means of a pump through the cooling spaces of the various machine aggregates for the purpose of cooling the latter. The feed or cooling water which has been heated in this way and is under pressure finally enters at 48 a vaporizer 49 by way of a pressure-reducing valve of any suitable construction (not shown), such vaporizer surrounding concentrically the pressure equalizer 41. The inlet 48 is preferably arranged tangentially, so that a comparatively large vaporizing surface is secured in the vaporizer in the manner of the indicated parabola. The cooling water which is vaporized upon the parabolic surface is collected in the dome 50, while the unvaporized water sinks to the bottom. In the further development of the invention, the vaporizer is arranged a short distance above the pressure equalizer 41 through a preferably conical sheet metal hood 52 whose outer edge reaches not quite to the walls of the vaporizer, so that a narrow slit or passage 52a remains free. The water which has not been vaporized upon the parabolic surface must thus flow through the just-mentioned narrow slit during its downward movement, and thus enters the vaporizer zone below the sheet metal hood 52 in a thin stream. This construction has the advantage that further vaporization takes place below the metal hood since here the radiant heat of the pressure equalizer 41, which according to the invention is arranged in the vaporizer, acts upon the heated cooling water. The finer, that is the thinner the stream of cooling water that is introduced into the lower vaporizing zone, the more favorable the condition for the generation of steam, the thickness of the stream being determined by the distance between the inner wall of the vaporizer and the outer edge of the hood 52. The cooling water vaporizing below the hood rises in the tube 53 connected to the hood and reaches the dome 50 through a lateral opening 54 provided near to the upper end of the tube, the steam mixing in the dome with the steam generated in the upper vaporizer zone. The steam collecting in the dome is first conducted to the gas-heated exchanger 45 through the pipe 51, the steam being superheated to a certain degree. In this condition the steam flows through a conduit 55 (Fig. 3) to the superheater coil 56 (Fig. 3) positioned in the lower part of the pressure equalizer 41. The superheated steam is finally withdrawn through conduit 57 and conducted to the steam turbine 16. After being partially exhausted in the latter it is mixed with the gases coming from the pressure equalizer 41 and is then directed, as already explained, into the continuous current turbine 15.

Both the continuous current 15 as well as the steam turbine 16 deliver their output through a common drive 58 and further through the couplings 12 to the generator 8 which is located in the special separate auxiliary frame 9. The generator is thus likewise positioned in the central longitudinal axis of the vehicle. The current delivered by the generator is conducted to the driving motors (not shown), coupled to the driving axles of the vehicle (central bogie truck), such driving motors being arranged at any desired distance from the generator. The generated current serves also to operate various motors, especially the controller motor 22, and may also be used for lighting and, if desired, also for heating purposes.

The whole combustion engine plant with all the machine sets and auxiliary devices, including the steam generating equipment, is arranged completely symmetrically and rests upon a base frame 59 which is common to at least all of the main members of the plant, the frame 59 in turn resting upon the auxiliary frame 10 which is movably suspended. In this way there results on the one hand completely uniform weight distribution of the power plant upon the bogie truck of the vehicle; on the other hand, the combustion plant with the base frame 59 can be raised as a unit from the machine space 3 and again reinserted into the latter. Because of the fact that the heavy parts of the plant, such as the prime movers, driving parts, etc. lie at the lower part of the vehicle, there results a favorable center of gravity for the vehicle which affords good riding and running properties. By virtue of the completely symmetrical arrangement and organic sequence of the machine members there is obtained the further advantage that all connections, conduits, linkages, etc. are very short; there is likewise obtained an extremely short construction for the driving parts. There is thus obtained according to the invention a combustion power plant of large output upon the smallest possible floor area.

Fig. 9 shows another modification of the invention. It is distinguished from the one above described, however, merely in the fact that the bogie truck 60 of the vehicle is completely free of the parts of the combustion engine plant, including the generator 8, such parts being arranged upon the floor of the car. In this way all axles of the vehicle are kept free on all sides of any structural parts, so that each axle can without difficulty be utilized as a driving and also as a braking axle. In the construction shown in Fig. 9, each axle of the bogie truck 60 is equipped with an electric motor 61.

Figure 10:
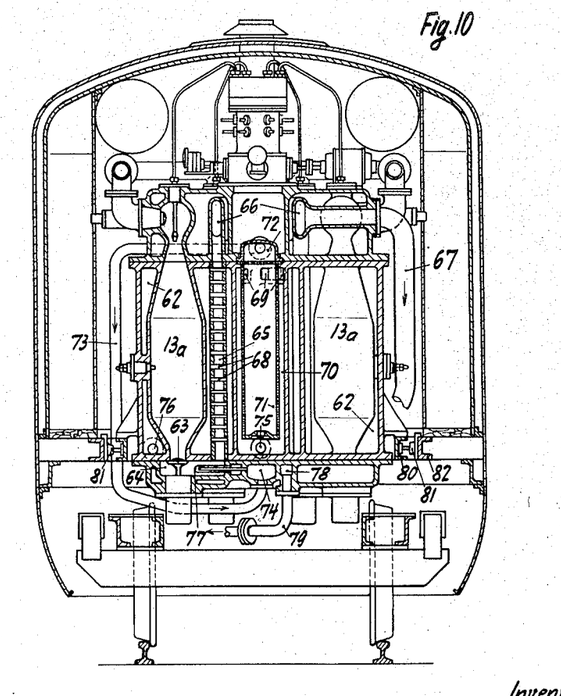
Fig. 10 shows a third embodiment of the invention in transverse cross-section in which the generated hot gases are employed for heating a steam boiler which comprises the first or initial stage, the latter being followed by an expansion machine which is driven by the partially exhausted gases.

Fig. 10 shows a combustion engine plant in which the high pressure gases generated in the explosion chambers 13a are not directed, as hereinabove described, into a high pressure gas turbine stage as the initial stage, but into a steam generator (explosion boiler) 62 to which is connected an exhaust gas turbine (not shown) which drives, for example, the compressor, such turbine utilizing the residual pressure drop of the compressed gases. The explosion chambers 13a are arranged symmetrically at both sides of the central longitudinal axis of the vehicle and are positioned upright, the inlet end being at the top. They are arranged within the drum-like explosion boiler 62 so that they are swept by the feed water of the latter. The outlet valve 63 of each explosion chamber lies in the longitudinal axis of the chamber. The gases generated in the explosion chambers, upon opening of the respective outlet valves 63, flow into the channel 64 to which is attached a chest-like gas conduit 65. The latter passes through the water-filled boiler drum 62 along the length of the explosion chambers 13a upon the side positioned toward the longitudinal axis of the vehicle and opens into a gas collecting annular chamber 66 which is common to both explosion chambers, a gas conduit 67 leading the gases into the exhaust gas turbine. The gas conduits 65 are penetrated by a number of transverse water tubes 68 lying one behind the other in the gas path, the tubes 68 being thus swept by the hot combustion gases. The so-heated boiler water flows to the highest point of the boiler drum 62 through preferably tangentially directed channels 69 into the cylinder space 70 acting as a vaporizer, a sieve cylinder 71 being arranged concentrically with clearance in such space 70. The vaporizer is positioned in the central longitudinal axis of the vehicle. The steam separating from the heated boiler feed water in the vaporizer reaches the dome 72 to which is connected a steam conduit 73. The latter opens into the chamber 74 which lies in the central axis of the vehicle. The water not vaporized in the vaporizer flows downwardly through a conduit 75 and is re-introduced at 76 into the boiler space 62. The wet steam forming in the chamber 74 is conducted through the superheater 77 which projects far into the gas-filled space 64. The superheated steam flows into the annular space 78 from which it is introduced by way of the conduit 79 into the steam driven expansion machine (steam turbine) which drives the generator (not shown). The remaining structure of the combustion gas plant is otherwise essentially the same as that shown in Figs. 1 to 9. The whole combustion gas plant including the steam boiler structure rests upon a common frame work 80 which is advantageously suspended at three points 81 in the vehicle frame 82 and movable within certain limits, one of the points 81 lying in the central longitudinal axis of the vehicle.

The various embodiments of the invention above-described show that changes in the arrangement and location of the parts can be resorted to without departing from the inventive idea. This is true above all as regards the form of the individual machine elements and aggregates. It will of course be understood that the combustion gas power plant arrangement according to the invention can be utilized in every kind of vehicle.

I claim:

1. A combustion gas power plant for vehicles, such as self-propelled railway cars, comprising two elongated constant volume explosion chambers mounted upon opposite sides of the central longitudinal axis of the vehicle, an explosion turbine and a continuous current turbine driven by the explosion gases, auxiliary apparatus associated with the chambers and with the turbines and including a vaporizer for producing steam with the waste heat of the plant, said vaporizer being likewise of elongate form, said explosion chambers and said vaporizer being positioned upright upon the vehicle with their axes approximately parallel to each other and symmetrically with respect to the central longitudinal axis of the vehicle, said arrangement including an equalizing chamber receiving the puffs of gases exhausting under pressure from the explosion turbine and charging such gases into the constant current turbine, said equalizing chamber being positioned within the vaporizer in such manner that the heat radiated thereby is taken up by the water in the vaporizer.

2. A portable power plant as set forth in claim 1 wherein the vaporizer consists of two vaporizing compartments positioned one above the other.

3. A portable power plant as set forth in claim 1, wherein the vaporizer consists of two vaporizing compartments positioned one above the other, said compartments opening into a common steam collecting space lying in the axis of the vaporizer.

4. A combustion gas power plant for vehicles, such as self-propelled railway cars, comprising two pistonless elongated constant volume explosion chambers disposed symmetrically on opposite sides of the central longitudinal axis of the vehicle and having cooling jackets thereabout, engines driven by the combustion gases generated in said chambers and arranged on opposite sides of said axis, and arranged in a direction substantially parallel to the said longitudinal axis with reference to the explosion chambers, a steam engine, and auxiliary apparatus associated with the chambers and with the engines and including a heat exchanger of elongate form arranged externally of and to one side of said cooling jackets and heated by the exhausted gases discharged from the engines, a water tank, conduits for feeding water to the exchanger and for leading the generated steam to the steam engine, compressors on both sides of said axis and coupled to said engines for charging the explosion chambers, the elongate explosion chambers and heat exchanger being arranged upright with their axes approximately parallel to each other.

5. An arrangment according to claim 4 wherein the explosion chambers are arranged with their inlet ends for the operating media at the top, each inlet being provided with an air valve and with a fuel injection nozzle for introducing fuel separately of the air, and a fuel feeding device and mechanism for driving said device both arranged in the vicinity of said inlet ends and symmetrically with respect to the longitudinal axis of the plant, said chambers having controlled outlet devices at their bottom ends and said engines being located at the level of said bottom ends and communicating directly with said outlet devices.

6. A combustion gas power plant for vehicles, such as self-propelled railway cars, comprising two elongated combustion chambers of constant internal volume arranged symmetrically on opposite sides of the central longitudinal axis of the vehicle, one or more engines driven by the combustion gases generated in such chambers, compressor stages driven by said engines and arranged symmetrically on both sides of said axis, a steam engine, auxiliary apparatus associated with the chambers and with the engines and including a heat exchanger of elongate form arranged separately and to one side of the explosion chambers, a water tank, and conduits for feeding water to the exchanger and for leading the generated steam to the steam engine, the chambers and heat exchanger being arranged upright with their axes approximately parallel to each other and the heat exchanger being disposed in the central longitudinal axis of the vehicle, and a transverse beam connected to the explosion chambers adjacent to their upper ends, certain of the auxiliary apparatus being supported by said beam.

7. A combustion gas power plant for vehicles, such as self-propelled railway cars, comprising elongated constant volume explosion chambers; engines driven by the explosion gases generated in said chambers; auxiliary apparatus associated with the chambers and with the engines; said explosion chambers being arranged upright with the axes approximately parallel to each other and symmetrically upon opposite sides of the central longitudinal axis of the vehicle; said engines including explosion turbines arranged upon opposite sides of said axis, and a continuous current turbine driven by the gases exhausting from the explosion turbines and positioned between the explosion turbines; symmetrically arranged compressors driven by the explosion turbines; a steam turbine; said continuous current gas turbine and said steam turbine being located between the explosion turbines; a steam generator heated by the exhaust gases and connected to the steam turbine; and an equalizer receiving the puffs of gases exhausting under pressure from the explosion turbines and charging them into a continuous gas turbine, said equalizer being of elongate form and being positioned upright in the central longitudinal axis of the vehicle.

8. A combustion gas power plant for vehicles such as self-propelled railway cars comprising two elongated constant volume explosion chambers disposed symmetrically upon opposite sides of the central longitudinal axis of the vehicle, an explosion turbine associated with each of said chambers and driven by the gases generated in such chamber, auxiliary apparatus associated with the chambers and with the turbines, said apparatus including two compressor stages, one driven by each of said turbines, said stages being positioned with their axes parallel to each other upon opposite sides of the longitudinal axis of the vehicle, an interstage air cooler connecting said compressor stages and supported therebetween, and two elongate collectors for the compressed air positioned symmetrically with respect to the central longitudinal axis of the vehicle.

9. A portable power plant as set forth in claim 8 wherein the air collectors are mounted upon the compressor stages.

10. A portable power plant as set forth in claim 4, including a steam superheater and a conduit for leading the exhausted gases thereinto, said superheater being of elongate form and being positioned upright upon the vehicle along approximately the longitudinal axis of the vehicle and approximately between the explosion chambers.

11. An arrangement according to claim 4, wherein the heat exchanger comprises a vaporizer for producing steam with the waste heat of the plant, said vaporizer being positioned upright along the central longitudinal axis of the vehicle and approximately between the explosion chambers.

12. An arrangement according to claim 4, wherein the heat exchanger generates steam with the waste heat of the gases, the plant including a continuous current turbine, said turbine being driven by the gases exhausting from said engines and being positioned between the combustion gas engines.

13. A combustion gas power plant for vehicles, such as self-propelled railway cars, comprising two elongated combustion chambers of constant internal volume arranged symmetrically on opposite sides of the central longitudinal axis of the vehicle, one or more engines driven by the combustion gases generated in such chambers, compressor stages driven by said engines and arranged symmetrically on both sides of said axis, a steam engine, auxiliary apparatus associated with the chambers and with the engines and including a heat exchanger of elongate form arranged separately and to one side of the explosion chambers, a water tank, and conduits for feeding water to the exchanger and for leading the generated steam to the steam engine, the chambers and heat exchanger being arranged upright with their axes approximately parallel to each other and the heat exchanger being disposed in the central longitudinal axis of the vehicle, a transverse beam connected to the explosion chambers adjacent to their upper ends, and one or more fuel pumps connected to the combustion chambers for feeding fuel thereinto and supported upon said transverse beam.

HANS HOLZWARTH.